United States Patent
Moradians et al.

(10) Patent No.: US 8,496,205 B2
(45) Date of Patent: Jul. 30, 2013

(54) DUAL PIVOT PALLET TYPE CARGO LOAD RESTRAINT

(75) Inventors: Edward Moradians, Canoga Park, CA (US); Robert Smith, Redondo Beach, CA (US)

(73) Assignee: Ancra International, LLC, Asuza, CA (US)

( * ) Notice: Subject to any disclaimer, the term of this patent is extended or adjusted under 35 U.S.C. 154(b) by 406 days.

(21) Appl. No.: 12/799,771

(22) Filed: May 3, 2010

(65) Prior Publication Data

US 2013/0168494 A1   Jul. 4, 2013

(51) Int. Cl.
*B64C 1/20* (2006.01)

(52) U.S. Cl.
USPC .................................... 244/118.1; 244/137.1

(58) Field of Classification Search
USPC ................ 244/118, 137.1, 118.1; 410/46, 69, 410/70, 77, 78, 79, 80, 92
See application file for complete search history.

(56) References Cited

U.S. PATENT DOCUMENTS

| | | | |
|---|---|---|---|
| 3,424,410 A | 1/1969 | Galaup | |
| RE26,873 E | 4/1970 | Mollon | |
| 3,693,919 A | 9/1972 | Alberti et al. | 248/119 R |
| 3,698,679 A | 10/1972 | Lang et al. | 248/361 R |
| 3,741,504 A * | 6/1973 | Alberti et al. | 244/137.1 |
| 3,774,551 A | 11/1973 | Sweger | 105/366 C |
| 3,906,870 A | 9/1975 | Alberti | 105/464 |
| 3,927,622 A * | 12/1975 | Voigt | 410/79 |
| 4,005,788 A | 2/1977 | Ratliff | 214/77 |
| 4,095,704 A | 6/1978 | Ratliff | 214/77 |
| 4,134,345 A | 1/1979 | Baldwin et al. | 105/366 B |
| 4,401,286 A | 8/1983 | Naffa | 244/137 R |
| 4,430,032 A | 2/1984 | Morgan | 410/68 |
| 4,498,823 A | 2/1985 | Trautman | 410/84 |
| 4,583,896 A | 4/1986 | Vogg et al. | 410/69 |
| 4,696,609 A | 9/1987 | Cole | 410/69 |
| 4,900,204 A | 2/1990 | Summers | 410/97 |

(Continued)

OTHER PUBLICATIONS

International Search Report and Written Opinion for PCT/US2010/001879, dated Oct. 28, 2010.

*Primary Examiner* — Tien Dinh
*Assistant Examiner* — Justin Benedik
(74) *Attorney, Agent, or Firm* — Brinks Hofer Gilson & Lione

(57) ABSTRACT

A dual pivot load restraint for cargo aircraft for restraining pallet type loads from vertical movement having an upper pivot member pivotally mounted on a lower pivot member and the lower pivot member is pivotally mounted on a base member and the upper pivot member having an engagement portion having an engagement position for projecting into pockets on a pallet type cargo load and abutting against a lower wall thereof, and the lower pivot member having an engagement position for the upper pivot member in the engagement position thereof, and the walls of the pallet type cargo load engaging the engagement portion of the upper pivot member to move the upper pivot member to a retracted position for movement of the pallet type cargo load in the aft direction of the aircraft, and the walls of the pallet type cargo load engaging the engagement portion of the upper pivot member to move the upper pivot member with the lower pivot member to a retracted position of the lower pivot member, and having resilient members for resisting movement of the upper pivot member and the lower pivot member from the engagement positions thereof and urging the movement of the upper pivot member and the lower pivot member to the engagement positions thereof after movement therefrom.

19 Claims, 5 Drawing Sheets

U.S. PATENT DOCUMENTS

| | | | | |
|---|---|---|---|---|
| 5,011,348 A | * | 4/1991 | Jensen et al. | 410/79 |
| 5,035,184 A | | 7/1991 | Bott | 104/121 |
| 5,085,326 A | | 2/1992 | Russell et al. | 211/4 |
| 5,090,638 A | | 2/1992 | Eilenstein-Wiegmanns et al. | 244/118.1 |
| 5,098,038 A | | 3/1992 | Hruska et al. | 244/137.1 |
| 5,130,899 A | | 7/1992 | Larkin et al. | 362/32 |
| 5,169,091 A | | 12/1992 | Beroth | 244/122 |
| 5,178,346 A | | 1/1993 | Beroth | 244/122 R |
| 5,234,297 A | | 8/1993 | Wieck et al. | 410/77 |
| 5,265,991 A | | 11/1993 | Herrick et al. | 410/69 |
| 5,316,242 A | | 5/1994 | Eilenstein-Wiegmann et al. | 244/137 |
| 5,346,161 A | | 9/1994 | Eilenstein-Wiegmann et al. | 244/137.1 |
| 5,370,342 A | | 12/1994 | Nordstrom | 244/118.1 |
| 5,397,078 A | | 3/1995 | Eilenstein-Wiegmann et al. | 244/118.1 |
| 5,489,172 A | | 2/1996 | Michler | 410/105 |
| 5,564,654 A | | 10/1996 | Nordstrom | 244/118.1 |
| 5,573,359 A | | 11/1996 | Moradians | |
| 5,609,452 A | | 3/1997 | Looker et al. | 410/105 |
| 5,618,139 A | * | 4/1997 | Graf et al. | 410/69 |
| 5,692,862 A | | 12/1997 | Hilde | 410/69 |
| 5,816,758 A | | 10/1998 | Huber | 410/77 |
| 5,957,406 A | | 9/1999 | Nelson et al. | 244/118.1 |
| 6,039,519 A | | 3/2000 | Jones et al. | 410/69 |
| 6,220,418 B1 | * | 4/2001 | Moradians | 193/35 A |
| 6,485,239 B2 | | 11/2002 | Afful | 410/80 |
| 7,435,043 B2 | * | 10/2008 | Brekken et al. | 410/69 |
| 7,731,460 B2 | | 6/2010 | Brown et al. | 410/77 |
| 2007/0086871 A1 | * | 4/2007 | Brekken et al. | 410/77 |

* cited by examiner

DUAL PIVOT PALLET TYPE CARGO LOAD RESTRAINT

BACKGROUND OF THE INVENTION

1. Field of the Invention

This invention relates to cargo load restraints and more particularly to a restraint arrangement in a cargo aircraft for restraint of pallet type cargo loads of the type having side pockets to restrain the pallet type cargo loads from vertical movement and allow free movement of the pallet type cargo loads in the forward and aft directions on the aircraft without interfering with such movement of the pallet type cargo loads.

2. Description of the Prior Art

Various transportation vehicles, such as large cargo carrying aircraft, are often required to carry a variety of loads. It is current practice to have such loads placed on pallets. The pallets are often loaded onto the aircraft from an aft loading door or a side loading door. In general, pairs of spaced apart rails are provided on the aircraft and the spacing between the pairs of rails corresponds to the width of the pallet type loads. Whether loaded from a rear door or from a side door, the pallets must be able to move on the rails in the longitudinal direction, that is, in the fore and aft directions during the loading and unloading of the pallets from the aircraft.

The rails, as may be installed on a loading deck of an aircraft, generally run the longitudinal length of the cargo area of the aircraft and for each width of the pallets the corresponding rails are, in general, equally spaced from the centerline of the aircraft.

The standardized pallet sizes are specified in the NAS 3610 Cargo Unit Load Devices Specification and the teaching and technology thereof are incorporated herein by reference.

Thus, the width of the pallets may be, for example, eight feet, ten feet, twelve feet, and the like. The aircraft may have pairs of rails corresponding to a specified width so that the aircraft may have the capability of carrying, on the same flight, a large number of pallet type cargo loads of the specified width pallets. Cargo restraints are often mounted on or adjacent to the rails to restrain the pallets from vertical movement during transportation from one location to another.

Consequently, in loading and unloading the pallets, the pallets must be able to pass freely by the restraints by, for the pallets in the desired load position in the aircraft, the restraints must engage the pallet type loads to restrain the loads from the vertical movement. For efficiency it is desired that the restraints be fixed on the rails in a desired longitudinal spaced array corresponding to the longitudinal spacing of pockets on the pallets and in transverse alignment so that the restraints engage both sides of the pallet.

If the restraints were to be removable, considerable time is wasted in installing and removing the restraints in order to allow the pallets to pass thereby and then install the restraints when the pallet type cargo load is in the desired position. If the restraints are fixed in place, the restraints must be capable of not interfering with movement of the pallets as the pallets are loaded and unloaded.

Accordingly, it is an object of the present invention to provide an improved pallet type cargo load restraint for restraining cargo type pallets from vertical movement in an aircraft.

It is another object of the present invention to provide an improved pallet type cargo load restraint for restraining cargo type pallets from vertical movement in an aircraft in which the restraints do not interfere with the forward and aft movement of the pallet type loads during the loading and unloading thereof.

It is another object of the present invention to provide an improved pallet type cargo load restraint for restraining cargo type pallets from vertical movement in an aircraft in which the restraints are automatically in a restraining engagement with the pallet type cargo loads for the condition of the pallet type cargo loads at a desired preselected location in the aircraft.

It is yet another object of the present invention to provide an improved pallet type cargo load restraint for restraining cargo type pallets from vertical movement in an aircraft in which the restraints are automatically in a restraining engagement with the pallet type cargo loads for the condition of the pallet type cargo loads at a desired preselected location in the aircraft and in which the pallet type cargo loads move the restraint out of restraining engagement during forward and aft movement of the cargo type pallet restraints.

SUMMARY OF THE INVENTION

The above and other objects of the present invention are achieved, in a preferred embodiment thereof by providing pairs of pallet type cargo restraints in left hand and right hand versions thereof in a preselected spaced apart longitudinal array extending in the forward and aft directions in a cargo aircraft and the left hand and right embodiments of the pallet type cargo restraint are in transverse alignment with a left hand pallet type cargo restraint in transversely spaced apart alignment with a right hand pallet type cargo restraint.

The cargo aircraft utilizing the pallet type cargo restraints of the present invention are provided with a loading deck. A pair of generally "U" shaped rails are mounted on the cargo deck in transversely spaced apart parallel alignment. The base of the "U" shaped rails is coupled to the cargo deck and the legs of the "U" shaped rails extend upwardly therefrom.

A first plurality of pallet type cargo restraints which may be considered the left hand embodiment of the present invention are coupled to a first of the pair of rails in a preselected spaced array. The preselected spacing of the pallet type cargo restraint corresponds to the spacing of the pockets that are provided on the longitudinal sides of a pallet type cargo load.

A second plurality of pallet type cargo restraints which may be considered the right hand embodiment of the present invention are coupled to the second of the pair of rails in the same preselected spaced array as the first pallet type cargo restraints and each of the first plurality of pallet type cargo restraints is transversely aligned with one of the second plurality of pallet type cargo restraints.

The structural features of each of the left hand and right hand embodiments of the pallet type cargo restraints of the present invention are identical except one is the mirror image of the other. The description of the present invention describes one of the embodiments, except as noted below where each of the left hand and right hand embodiments are illustrated for clarity in describing the structural features.

Each of the pallet type cargo restraints of the present invention are provided with a base member that has a lower connecting portion for attachment, for example, to the rails installed on the loading deck of a cargo aircraft. The base member has an upper mounting portion and the upper mounting portion has an upper support surface. A lower pivot member is pivotally mounted on the upper mounting portion of the base member above the upper support surface. The lower pivot member has limited pivotal movement in a first direction relative to the base member from a cargo restraint position thereof to a retracted position thereof and the return to the cargo restraint position from the retracted position. The lower pivot member pivotally rotates on a lower pivot post about a first axis. The lower pivot post extends through the upper mounting surface of the base member and the lower pivot member. A first resilient member which may be a coil spring is operatively connected between the base ember and the lower pivot member to yielding resist movement of the lower pivot member from the cargo restraint position thereof to the retracted position thereof and to urge the return of the lower pivot to the cargo restraint position from the retracted position. The lower pivot member has a generally planar upper surface.

The mounting portion of the base member has an outer edge and the upper support surface has first walls defining an outer channel extending in an arcuate configuration. The mounting surface also has second walls spaced from the first walls, spaced from the first walls defining an inner channel extending in an arcuate configuration. The arcuate configuration of the first and second channels is circular and concentric with the first axis. The lower pivot member has an outer edge portion positioned in and movable in the outer channel during movement of the lower pivot member between the cargo restraint position and the retracted position. The lower pivot member also has an inner edge positioned in the inner channel and movable therein during movement of the lower pivot member between the cargo restraint position and the retracted position.

A first lower stop member is mounted on the upper support surface and extends upwardly therefrom and is spaced from the first axis. The lower stop member engages the lower pivot member for the lower pivot member in the retracted position to limit the movement of the lower pivot member about the first axis in a first pivot direction to the retracted position.

The second walls defining the inner channel also has a second lower stop surface for engaging the lower pivot member to limit the pivotal movement of the lower pivot member from the retracted position in a second pivot direction to provide the lower pivot member in the cargo restraint position.

The lower pivot member also has an upstanding upper stop member extending above the planar surface of the lower pivot member. The upper stop member has a first and a second stop surfaces An upper pivot member is pivotally mounted on the lower pivot member for both pivotal movement relative to the lower pivotal member and in a second pivot direction and movable with the lower pivot member for movement of the lower pivot member between the cargo restraint position and the retracted position thereof. The upper pivot has a cargo load engaging portion which extends outwardly from the base member and the lower pivot member for the condition of the upper pivot member in the cargo restraint position thereof and aligned with a pocket on the pallet type cargo load. In such alignment the lower surface of the upper pivot member abuts the lower wall of the pocket of the pallet to restraint the vertical movement of the pallet type load. As the pallet type load moves in the forward direction, a first wall of the pocket engages the load engaging portion of the upper pivot member and moves the upper pivot member against the first stop surface of the upper stop member. The engagement of the upper pivot member with the first stop surface of the upper stop member moves the lower pivot member in the first pivot direction from the cargo restraint position to the retracted position thereof. Such movement is repeated as the pallet type load is moved forward and the lower pivot member with the upper pivot member thereon repeatedly moving between the cargo restraint position and the retracted position as each pocket on the pallet moves past. When the pallet type load is in the desired position on the aircraft and the pockets of the pallet are aligned with the pallet type cargo restraints the cargo load engagement portions of the upper pivot member engages the lower surface of the aligned pockets. The upper pivot member remains in the cargo restraint position thereof during such movement of the pallet.

When the pallet is removed from the aircraft and moves in the aft direction, a second wall on the pockets of the pallet engages the cargo load engaging portion of the upper pivot member and moves the upper pivot member in a second pivot direction opposite the first pivot direction relative to the lower pivot member until the upper pivot member engages the second stop surface on the upper stop member to be portioned in the retracted position thereof. In the retracted position of the upper pivot member, the upper pivot member overlies the lower pivot member and the base member. The lower pivot member remains in the cargo restraint position thereof during the movement of the pallet in the aft direction as the upper pivot member moves between the retracted position thereof and the cargo restraint position thereof.

The pivotal movement of the upper pivot member on the lower pivot member is about a second axis that is substantially parallel to the first axis. An upper pivot post extends through the upper pivot member and the lower pivot member and is aligned with the second axis to provide the pivotal motion of the upper pivot member in the first and the second pivot directions.

BRIEF DESCRIPTION OF THE DRAWING

The above and other embodiments of the present invention my be more fully understood from the following detailed description taken together with the accompanying drawing wherein similar reference characters refer to similar elements throughout and in which.

DESCRIPTION OF THE PREFERRED EMBODIMENTS

Figure 1:
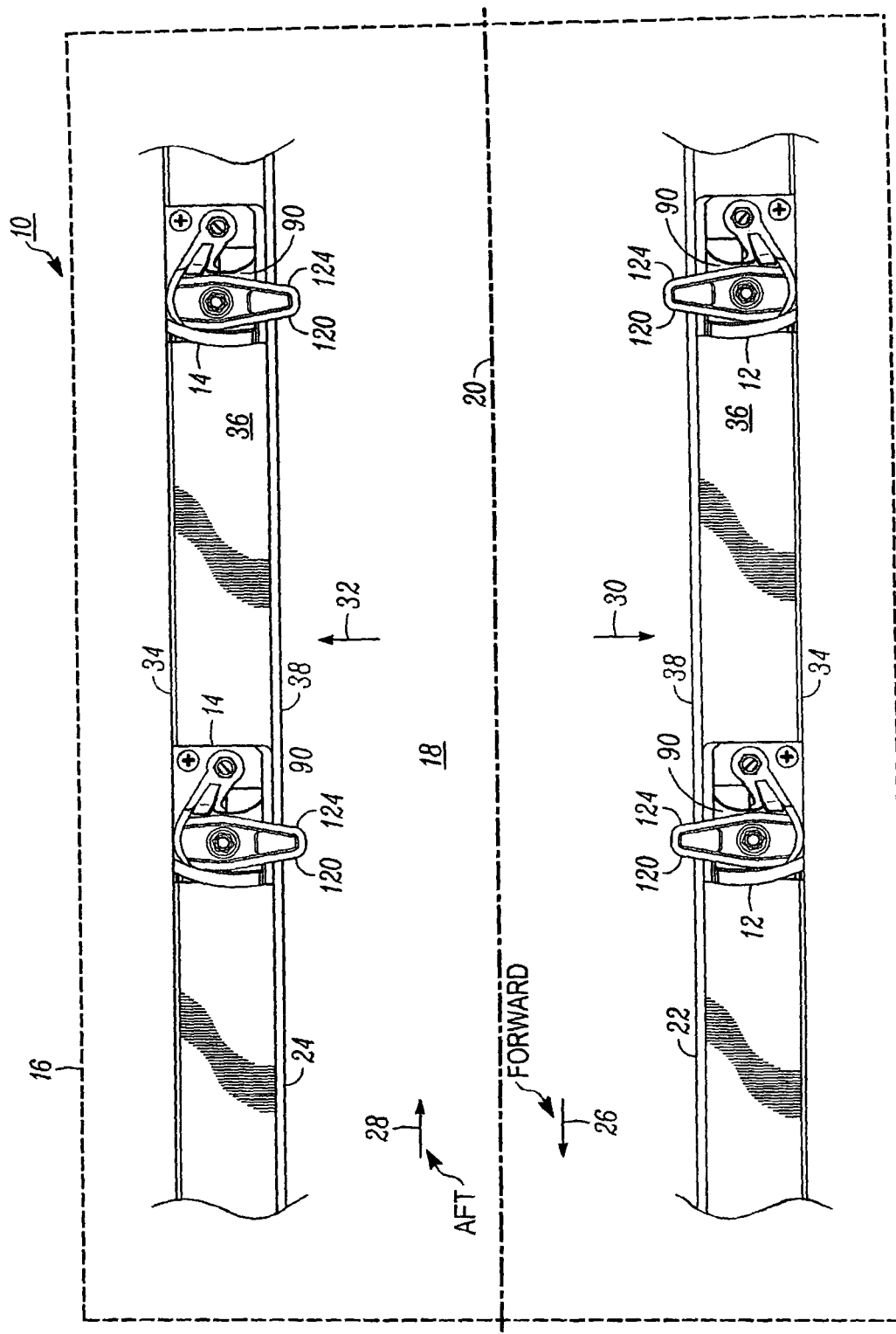
FIG. 1 illustrates an array of pallet type cargo restraints in accordance with the principles of the present invention as installed on a loading deck of an aircraft.

Referring now to the Figures of the drawing there is illustrated therein preferred embodiments of the present invention. In FIG. 1, there is illustrated an embodiment generally designated 10 of an array of a first plurality of pallet type cargo restraints 12 and a second plurality of pallet type cargo restraints 14 are mounted in a transport aircraft 16 having a loading deck 18 which is generally symmetrical about a centerline 20. A pair of rails 22-24 are provided on the loading deck 18 and are spaced transversely apart in a separation defined by the size of the particular pallet type cargo load and adjacent to which pallet type cargo loads as defined in the above mentioned NAS 3610 Cargo Unit Load Devices Specification may move in the longitudinal directions indicated by the arrow 26 in the forward direction and 28 in the aft direction. The transverse directions, that is, perpendicular to the centerline 20 transport vehicle 12 are indicated by the arrows 30 and 32.

The first plurality of pallet type load restraints 12 are in a preselected longitudinally spaced apart array corresponding to the spacing of the pockets on the pallet type load.

The second plurality of pallet type cargo restraint are mounted on the rail 24 in the same preselected longitudinally spaced array as the first plurality of pallet type cargo restraints 12 and are in transversely aligned relationship therewith so that each of the pallet type cargo restraints 12 are aligned with one of the pallet type cargo restraints 14. In the preferred embodiments of the present invention, the pallet type cargo restraints 12 and 14 operate in the same fashion during the loading and unloading of pallet type cargo loads from the aircraft 16. Consequently, each of the second plurality of pallet type cargo restraints 14 is a mirror image of the pallet type cargo restraints 12. That is, in the conventional notation in aircraft design, the pallet type cargo restraints 12 may be considered left hand and the pallet type cargo restraints 14 may be considered right hand. The structural elements of each of the first plurality of pallet type cargo restraints 12 is identical to the corresponding structural elements of the plurality of pallet type cargo restraints 14.

The rails 22 and 24 are generally "U" shaped and have a base portion 36 attached to the cargo deck 18 and upstanding member 36 and 38. The first and second plurality of pallet type cargo restraints 12 and 14 are bolted or otherwise attached to the rails 22 and 24.

Figure 2:
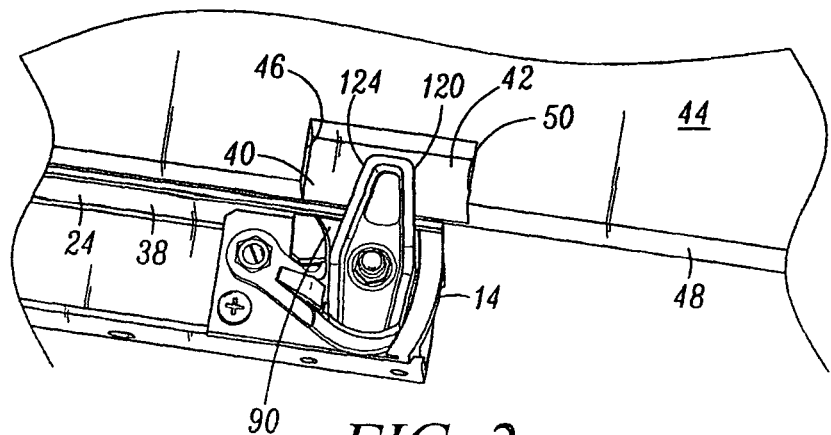
FIG. 2 is a pictorial view of a pallet type cargo restraint in accordance with the principles of the present invention in restraining engagement position with a pallet type cargo load to prevent vertical movement thereof.

FIG. 2 is pictorial view of one of the plurality of pallet type cargo restraints 14 in a position to engage a bottom wall 40 of a pocket 42 of a pallet type cargo load 44 in which position the pallet type cargo restraint 14 restrains the pallet 44 from movement in the vertical direction.

Figure 3:
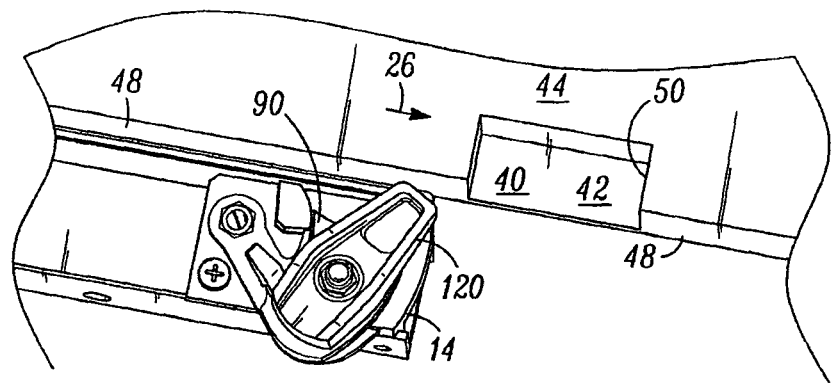
FIG. 3 is a pictorial view of a pallet type cargo restraint in accordance with the principles of the present invention as a pallet type cargo load moves past the restraint in the forward direction.

FIG. 3 is a pictorial view of the pallet type cargo restraint 14 shown in FIG. 2 as the pallet type cargo load 44 moves in the forward direction indicated by the arrow 26. A first wall 46 of the pocket 40 has engaged the pallet type cargo restraint 14 and moved it to the position shown on FIG. 3. The longitudinal surface 48 of the pallet 42 continues to bear against the pallet type cargo restraint 14 to restrain the pallet type cargo restraint 14 in the position shown in FIG. 3 until the next pocket (not shown) is aligned with the pallet type cargo restraint 14 at which alignment the pallet type cargo restraint 14 moves back to the position shown in FIG. 2. The movement of the pallet type cargo restraint 14 between the position shown in FIG. 3 and the position shown in FIG. 2 is repeated as each pocket 40 passes the pallet type cargo restraint 14 until the pallet 42 is in the desired location with the pockets 40 aligned with each of the pallet type cargo restraints 14 and 12 and the pallet type cargo restraint restraints 14 and 12 are in the position shown in FIG. 2.

Figure 4:
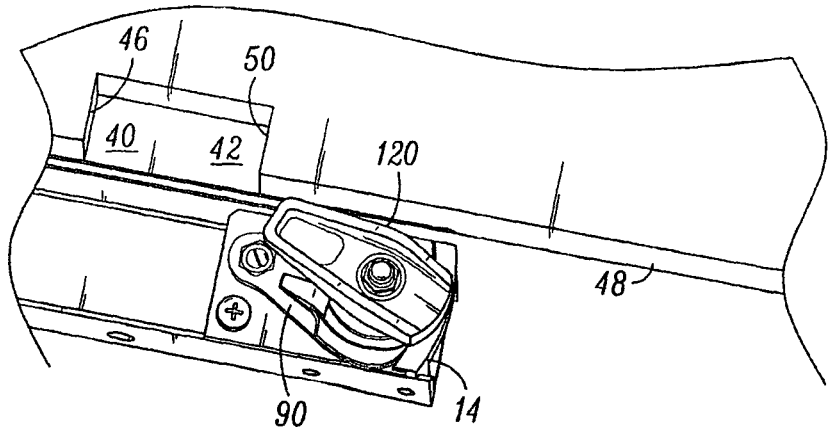
FIG. 4 is a pictorial view of a pallet type cargo restraint in accordance with the principles of the present invention as a pallet type cargo load moves past the restraint in the aft direction.

FIG. 4 is a pictorial view of the pallet 42 being unloaded from the aircraft and moving in the aft direction indicated by the arrow 28. A second wall 50 of the pocket 40 has engaged the pallet type cargo restraint 14 and moved the pallet type cargo restraint 14 to the position shown in FIG. 4. The longitudinal wall 48 of the pallet 42 maintains the pallet type cargo restraint 14 in the position shown in FIG. 4 until the nest pocket 40 (not shown) is aligned with the pallet type cargo restraint 14 and the pallet type cargo restraint 14 moves to the position shown in FIG. 2. this movement of the pallet type cargo restraint 14 is repeated until the pallet is unloaded from the cargo deck 18 of the aircraft 16, at which time the pallet type cargo restraint 14 is in the position shown in FIG. 2.

As described below in greater detail the pallet type cargo restraints have two moving operative parts: a lower pivot member 90 and an upper pivot member 120. The relative position of the lower pivot member 90 and the upper pivot member 120 for the three operative conditions illustrated in FIGS. 1, 2, 3 and 4 are shown in Table 1.

TABLE 1

POSITION OF LOWER PIVOT MEMBER, UPPER PIVOT MEMBER FOR VARIOUS RELATIVE POSITIONS OF THE PALLET

| PALLET POSITION | LOWER PIVOT MEMBER POSITION | UPPER PIVOT MEMBER POSITION |
|---|---|---|
| POCKETS ALIGNED WITH UPPER PIVOT MEMBER | CARGO RESTRAINT POSITION | LOAD RESTRAINT POSITION |
| PALLET MOVING IN AFT DIRECTION | CARGO RESTRAINT POSITION | RETRACTED POSITION |
| PALLET MOVING IN FORWARD DIRECTION | RETRACTED POSITION | LOAD RESTRAINT POSITION |

Figure 5:
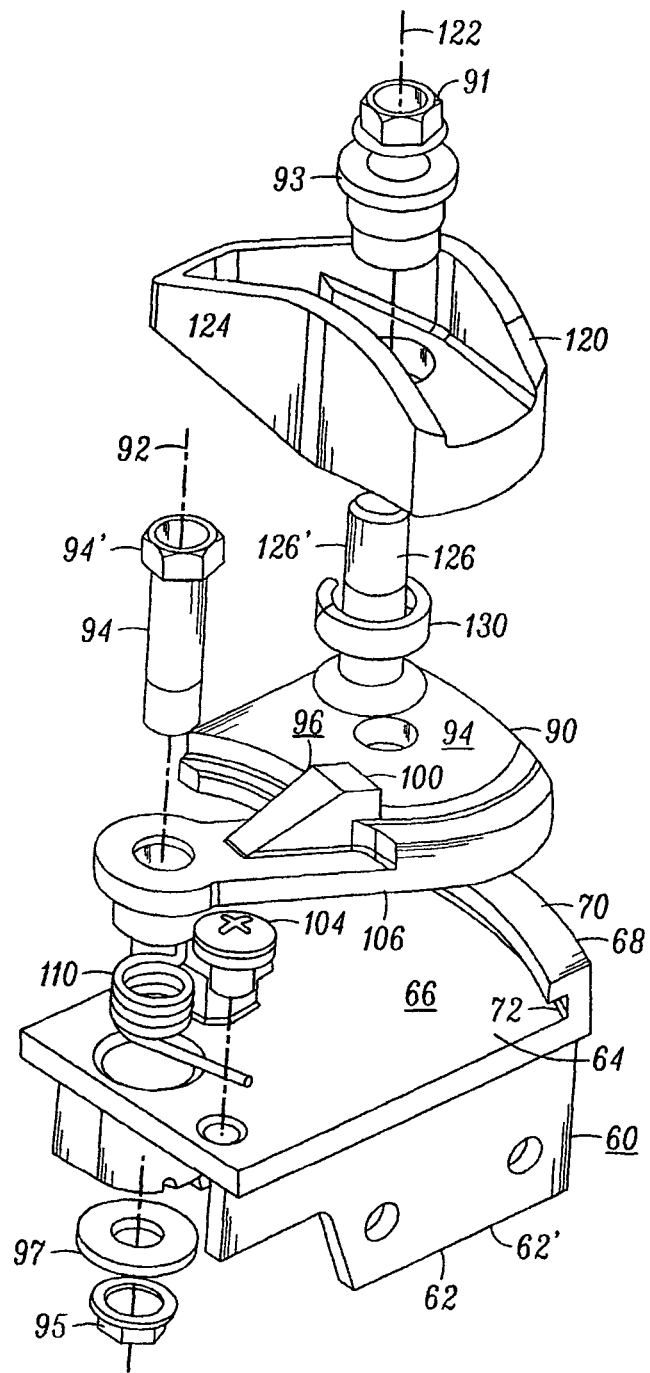
FIG. 5 is an exploded view of right hand embodiment of the a pallet type cargo restraint of the present invention.
Figure 6:
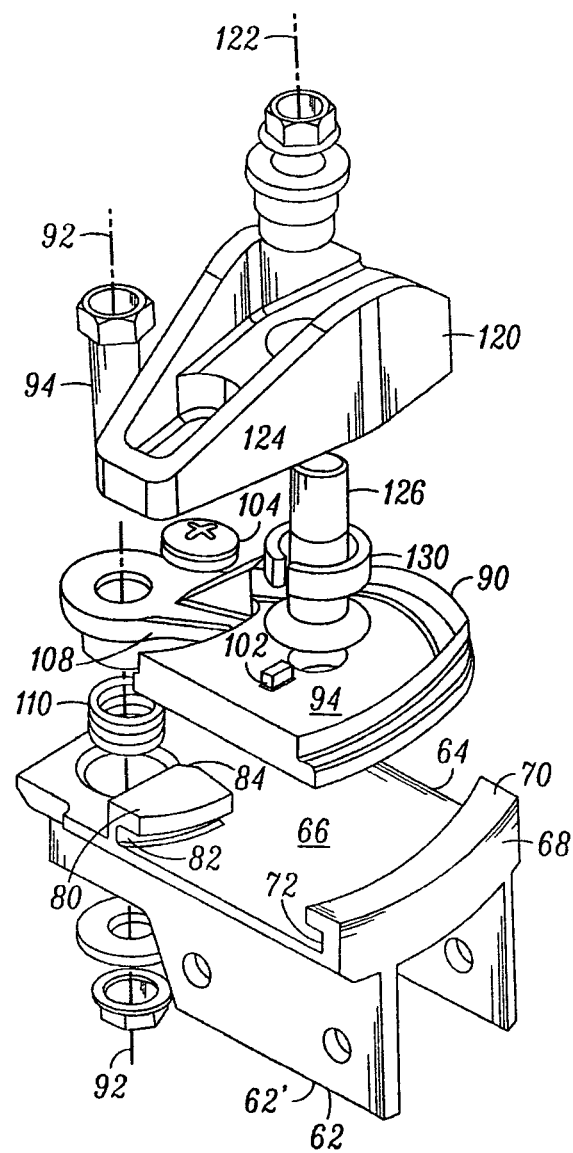
FIG. 6 is an exploded view of left hand embodiment of the a pallet type cargo restraint of the present invention.

FIGS. 5 and 6 are exploded perspective views of the pallet type cargo restraints 4 and 12, respectively. Both the left hand 14 and right hand 12 embodiments of the present invention are shown for clarity in better illustrating all the structural elements thereof even though both pallet type cargo restraint 12 and pallet type cargo restraint 14 are identical except pallet type cargo restraint 14 is a mirror image of pallet type cargo restraint 12.

Figure 7:
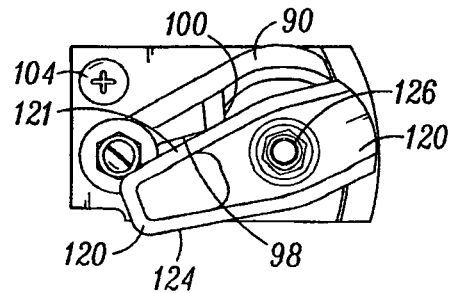
FIG. 7 illustrates a pallet type cargo restraint of the present invention in the position shown in FIG. 4.
Figure 8:
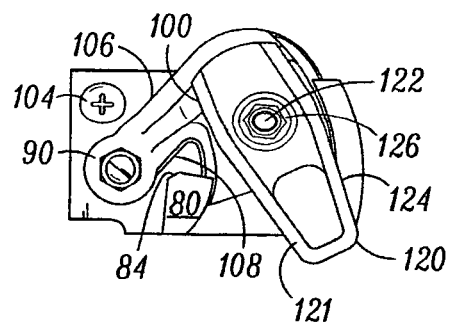
FIG. 8 illustrates a pallet type cargo restraint of the present invention in the position shown in FIG. 3; and, FIG. 9 is a perspective view of a base useful in the practice of the present invention.
Figure 9:
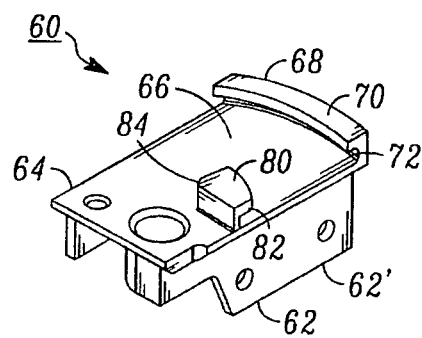

Referring now to FIGS. 5, 6, 7, 8 and 9, pallet type cargo restraints 12 and 14 are provided with a base member 60, shown in FIG. 9 in greater detail, having a lower connecting portion 62 and an upper mounting portion 64 spaced from the lower edge 62' of the lower portion 62. The mounting portion 64 has a generally planar upper support surface 66 and a outer edge 68. Outer walls 70 are provided at the outer edge 68 to define an outer channel 72. The outer channel 72 is arcuate in preferred embodiments of the present invention. Inner walls 80 are provided on the upper support surface 66 in spaced relationship to the outer walls 68 and the inner walls 80 define an arcuate inner channel 82. The arcuate outer channel 72 and arcuate inner channel 82 have the same arcuate configuration. The inner walls 80 also have a generally planar stop surface 84.

A lower pivot member 90 is pivotally mounted on the upper mounting portion 64 of the base member 60 for limited pivotal motion about a first axis 92 relative to the upper mounting surface 64 between a cargo restraint position described below in connection with FIG. 7 and as shown on FIGS. 1 and 4 and a retracted position as shown on FIG. 3 and described below in connection with FIG. 8. The first axis 92 is substantially perpendicular to the upper support surface 66. A lower pivot post 94 extends through the lower pivot member 90 and the upper mounting portion 64 of the base member 60 to provide the pivotal motion of the lower pivot member 90 about the axis 92. The lower pivot member 90 has a generally planar upper surface 94 and the upper surface 94 is provided with an upstanding upper stop member 96 in spaced relationship to the first axis 92. The upper stop member 96 has a generally planar first stop surface 98 and a generally planar second stop surface 100. A leaf spring stop member 102 is mounted on the upper surface 94 of the lower pivot member 90.

A first lower stop member 104 is mounted on the upper surface 64 of the mounting portion 64 and a first edge 106 of the lower pivot member engages the first lower stop member 104 to limit the pivotal motion of the lower pivot member 90 from the cargo restraint position to the retracted position to provide the lower pivot member in the retracted position thereof. A second edge 108 of the lower pivot member 90 engages the planar stop surface 84 on the inner walls 80 to limit the pivotal motion of the lower pivot member 90 from the retracted position to the cargo restraint position to provide the lower pivot member in the cargo restraint position.

A first resilient member 110 is mounted on the first pivot post 94 for operative inter engagement between the lower pivot member 90 and the base 60 for yieldingly resisting movement of the lower pivot member from the cargo restraint position to the retracted position and urging the lower pivot member to move from the retracted position to the cargo restraint position.

An upper pivot member 120 is pivotally mounted on the lower pivot member 90 for both pivotal movement of the upper pivot member 120 relative to the lower pivot member 90 as well as movement with the lower pivot member as the lower pivot member moves between the retracted position thereof and the cargo restraint position thereof. The upper pivot member 120 pivotally moves about a second axis 122 that is spaced from the first axis 92 and is substantially parallel thereto. An upper pivot post 126 extends through the upper pivot member and the lower pivot member and is free of engagement with the base member 60. The upper pivot post 126 is aligned with the second axis 122 for providing the pivotal motion of the upper pivot member about the second axis 122.

The upper pivot member has a cargo load engaging portion 124 extending to regions external the base member 60 and the lower pivot member 90 for the condition of the upper pivot member in the load restraint position thereof and the lower pivot member in the cargo restraint position thereof. As shown in FIGS. 1 and 2, the load engaging portion 124 of the upper pivot member 120 is aligned to engage the lower surface 42 of the pocket 40 of the pallet when in the load restraining position thereof to prevent vertical movement of the pallet 44.

A leaf spring 130 is operatively connected between the upper pivot member 120 and the lower pivot member to yieldingly resist movement of the upper pivot member relative to the lower pivot member for movement from the load restraint position to the retracted position and urging the upper pivot member to return to the load restraint position from the retracted position. The leaf spring 130 operatively engages the leaf spring stop 102 to provide the spring force on the upper pivot member 120. A lateral wall 121 of the upper pivot member 120 engages the planar stop surface 98 of the upper stop member for the upper pivot member 120 in the retracted position s shown on FIG. 7. The lateral wall 121 of the upper pivot member 120 engages the planar stop surface 120 for movement of the upper pivot member 120 with the lower pivot member 90 as the lower pivot member is moved from the load restraint position to the retracted position as shown on FIG. 8.

The lower pivot post 94 may be a headed screw 94' retained in the operative position thereof by conventional nut 95 and washer 97. Similarly, the upper pivot post 126 may be a screw 126' retained in place by a nut 91 and bushing 93.

Although specific embodiments of the present invention have been described above with reference to the various Figures of the drawing, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

What is claimed is:

1. A cargo load restraint for preventing vertical movement of a pallet type cargo load during air transport comprising, in combination:

a base member having a lower connecting portion and an upper mounting portion spaced from said connecting portion, said upper mounting portion having an upper support surface;

a lower pivot member pivotally mounted on said upper mounting portion adjacent said upper surface thereof for limited pivotal movement about a first axis relative to said upper mounting portion of said base member between a cargo restraint position and a retracted position, said first axis substantially perpendicular to said upper support surface of said base member;

a lower pivot post extending through said lower pivot member and through said upper mounting portion of said base member and aligned with said first axis for providing said limited pivotal movement of said lower pivot member;

an upper pivot member pivotally mounted on said lower pivot member for limited pivotal movement about a second axis in a second pivot direction opposite said first pivot direction, said second axis spaced from said first axis and substantially parallel thereto, said upper pivot member having a load restraint position and a retracted position and pivotally movable relative to said lower pivot member about said second axis between said load restraint position and said retracted position, and movable in said load restraint position with said lower pivot member for pivotal movement of said lower pivot member from said cargo restraint position to said retracted position;

an upper pivot post extending through said upper pivot member and through said lower pivot member and free of engagement with said upper support surface of said base member, said upper pivot post aligned with said second axis for providing pivotal movement of said upper pivot member about said second axis between said load restraint position and said retracted position relative to said lower pivot member for said lower pivot member in said cargo restraint position thereof;

said upper pivot member having a cargo load engaging portion extending to regions external said lower pivot member and said base member for said upper pivot member in said load restraint position, said cargo load engaging portion overlying said lower pivot member and said upper support surface for said upper pivot member in said retracted position thereof; and, said upper pivot member movable in said load restraint position thereof with said lower pivot member for movement of said lower pivot member between said cargo restraint position and said retracted position thereof.

2. The arrangement defined in claim 1 and further comprising:

inner walls on said upper surface of said upper portion of said base member and extending upwardly therefrom in regions spaced from said lower pivot post a first preselected distance for engaging said lower pivot member to limit said pivotal movement thereof to provide said lower pivot member in said cargo restraint position.

3. The arrangement defined in claim 2 and further comprising:
said upper pivot member having a planar lower surface;
said lower pivot member having a planar upper surface substantially parallel to said lower surface of said upper pivot member and spaced therefrom; and,
an upper stop member mounted on said upper surface of said lower pivot member in spaced relationship to said lower pivot post for engaging said upper pivot member to limit said pivotal movements thereof.

4. The arrangement defined in claim 3 wherein:
said upper stop member has a first stop surface for engaging said upper pivot member for pivotal movement from said load restraint position to said retracted position; and,
said upper stop member has a second stop surface for engaging said upper pivot member for movement of said lower pivot member from said cargo restraint position to said retracted position.

5. The arrangement defined in claim 4 wherein:
said first stop surface is planar; and,
said second stop surface is planar.

6. The arrangement defined in claim 1 and further comprising:
said upper portion of said base member has an outer edge;
outer walls on said upper surface in regions adjacent said outer edge defining an outer channel; and,
said lower pivot member has an outer edge positioned in and movable in said outer channel for movement of said lower pivot member between said cargo restraint position and said retracted position thereof.

7. The arrangement defined in claim 6 and further comprising:
inner walls on said upper surface in regions adjacent said lower pivot post defining an inner channel; and,
said lower pivot member has an inner edge positioned in and movable in said inner channel for said limited pivotal movement of said lower pivot member between said cargo restraint position and said retracted position thereof.

8. The arrangement defined in claim 7 and further comprising:
a first lower stop member mounted on said upper surface of said upper portion of said base member and extending upwardly therefrom in regions spaced from said lower pivot post a first preselected distance for engaging said lower pivot member to limit said pivotal movement thereof to provide said lower pivot member in said retracted position thereof;
a second lower stop member mounted on said upper surface of said upper portion of said base member and extending upwardly therefrom in regions spaced from said lower pivot post a second preselected distance for engaging said lower pivot member to limit said pivotal movement thereof to provide said lower pivot member in said cargo restrain position thereof.

9. The arrangement defined in claim 8 and further comprising:
said upper pivot member having a planar lower surface;
said lower pivot member having a planar upper surface substantially parallel to said lower surface of said upper pivot member and spaced therefrom; and,
an upper stop member mounted on said upper surface of said lower pivot member in spaced relationship to said lower pivot post for engaging said upper pivot member to limit said pivotal movements thereof.

10. The arrangement defined in claim 9 wherein:
said upper stop member has a first stop surface for engaging said upper pivot member for pivotal movement from said load restraint position to said retracted position; and,
said upper stop member has a second stop surface for engaging said upper pivot member for movement of said lower pivot member from said cargo restraint position to said retracted position.

11. The arrangement defined in claim 10 and further comprising:
a first resilient member mounted on said lower pivot post and extending between said base member and said lower pivot member for yieldingly resisting movement thereof from said cargo restraint position to said retracted position thereof and urging movement thereof from said retracted position to said cargo restraint position.

12. The arrangement defined in claim 11 and further comprising:
a second resilient member operatively mounted on said upper pivot post and extending between said upper pivot member and said lower pivot member for yieldingly resisting pivotal movement of said upper pivot member from said load restraint position to said retracted position and urging said upper pivot member to return from said retracted position to said load restraint position.

13. The arrangement defined in claim 12 wherein:
said first resilient member is a coil spring; and,
said second resilient member is a leaf spring.

14. The arrangement defined in claim 13 and further comprising:
leaf spring stop member mounted on said lower pivot member and extending upwardly therefrom for engaging said leaf spring.

15. A cargo load restrain arrangement mounted on an aircraft loading deck for preventing vertical movement of a pallet type cargo load during air transport and allowing movement of the pallet type cargo load in the longitudinal forward and aft directions in the aircraft, the pallet type cargo load having spaced apart pockets on longitudinal extending walls thereof comprising, in combination:
a pair of track members mounted on said aircraft deck in a spaced apart transverse direction perpendicular to said longitudinal direction and extending in the longitudinal direction in a substantially parallel relationship;
a first plurality of cargo load restraints mounted on a first of said pair of track members in a preselected spaced relationship, said preselected spaced relationship corresponding to the spacing of the pockets on the pallet type cargo load;
a second plurality of cargo load restraints mounted on the second of said pair of track members in said preselected spaced relationship, and each of said second plurality of cargo load restraints transversely opposite one of said first plurality of cargo load restraints;
each of said first plurality of cargo load restraints and each of said second plurality of cargo load restraints comprising:
a base member having a lower connecting portion and an upper mounting portion spaced from said connecting portion, said upper mounting portion having an upper support surface and one of said base members of each of said first and second plurality of pallet type cargo restraints coupled to one of said first and second of said pair of track members;

a lower pivot member pivotally mounted on said upper mounting portion adjacent said upper surface thereof for limited pivotal movement in a first pivot direction about a first axis relative to said upper mounting portion of said base member between a cargo restraint position and a retracted position, said first axis substantially perpendicular to said upper support surface of said base member;

a lower pivot post extending through said lower pivot member and through said upper mounting portion of said base member and aligned with said first axis for providing said limited pivotal movement of said lower pivot member;

an upper pivot member pivotally mounted on said lower pivot member for limited pivotal movement about a second axis in a second pivot direction opposite said first pivot, and said second axis spaced from said first axis and substantially parallel thereto, said upper pivot member having a load restraint position and a retracted position and pivotally movable relative to said lower pivot member about said second axis between said load restraint position and said retracted position, and movable in said load restraint position with said lower pivot member for pivotal movement of said lower pivot member between said retracted position and said cargo restraint positions thereof;

an upper pivot post extending through said upper pivot member and through said lower pivot member and free of engagement with said upper support surface of said base member, said upper pivot post aligned with said second axis for providing said pivotal movement of said upper pivot member about said second axis between said load restraint position and said retracted position relative to said lower pivot member for said lower pivot member in said load restraint position thereof;

said upper pivot member having a cargo load engaging portion extending to regions external said lower pivot member and said base member and into the pockets on the pallet type cargo load for said upper pivot member in said load restraint position and the pockets on the pallet type cargo load aligned with said upper pivot member whereby said cargo load engaging portion engages a bottom wall of the pockets to restrain the pallet from vertical movement;

a first wall of the pockets engaging said cargo load engaging portion to move said upper pivot member with said lower pivot member for movement of said lower pivot member from said cargo restraint position to said retracted position thereof for movement of said pallet type cargo load in the forward direction, and a second wall of said pockets of said pallet type load restraint engaging said cargo load engaging portion of said upper pivot member to move said upper pivot member from said load restraint position into said retracted position thereof, and said cargo load engaging portion overlying said lower pivot member and said upper support surface for said upper pivot member in said retracted position thereof.

16. The arrangement defined in claim 15 wherein each of said second plurality of cargo load restraints comprises a mirror image of said cargo restraints in said first plurality thereof.

17. The arrangement defined in claim 16 wherein each of said first plurality of cargo load restraints and said second plurality of cargo load restraints further comprises:

a first resilient member mounted on said lower pivot post and extending between said base member and said lower pivot member for yieldingly resisting movement thereof from said cargo restraint position to said retracted position and urging movement thereof from said retacted position to said cargo restraint position;

a second resilient member operatively mounted on said upper pivot post and extending between said upper pivot member and said lower pivot member for yieldingly resisting pivotal movement of said upper pivot member from said load restraint position to said retracted position and urging said upper pivot member to return to said load restraint position from said retracted position;

said first resilient member is a coil spring; and, said second resilient member is a leaf spring.

18. The arrangement defined in claim 17 wherein each of said first plurality of cargo load restraints and said second plurality of cargo load restraints further comprises:

said upper portion of said base member has an outer edge;

outer walls on said upper surface in regions adjacent said outer edge defining an outer channel;

said lower pivot member has an outer edge positioned in and movable in said outer channel for movement of said lower pivot member between said cargo restraint position and said retracted position thereof;

inner walls on said upper surface in regions adjacent said lower pivot post defining an inner channel;

said lower pivot member has an inner edge positioned in and movable in said inner channel for said limited pivotal movement of said lower pivot member between said cargo restraint position and said retracted position thereof; and, said outer channel and said inner channel are arcuate comprising arcs of circles concentric with said first axis.

19. The arrangement defined in claim 18 wherein each of said first plurality of cargo load restraints and said second plurality of cargo load restraints further comprises:

a first lower stop member mounted on said upper surface of said upper portion of said base member and extending upwardly therefrom in regions spaced from said lower pivot post a first preselected distance for engaging said lower pivot member to limit said pivotal movement thereof to provide said lower pivot member in said retracted position thereof;

a second lower stop member mounted on said upper surface of said upper portion of said base member and extending upwardly therefrom in regions spaced from said lower pivot post a second preselected distance for engaging said lower pivot member to limit said pivotal movement thereof to provide said lower pivot member in said cargo restraint position thereof;

said upper pivot member having a planar lower surface;

said lower pivot member having a planar upper surface substantially parallel to said lower surface of said upper pivot member and spaced therefrom.

* * * * *

UNITED STATES PATENT AND TRADEMARK OFFICE
CERTIFICATE OF CORRECTION

PATENT NO. : 8,496,205 B2
APPLICATION NO. : 12/799771
DATED : July 30, 2013
INVENTOR(S) : Edward Moradians et al.

It is certified that error appears in the above-identified patent and that said Letters Patent is hereby corrected as shown below:

In the Claims

In column 10, claim 15, line 37, after "A cargo load" replace "restrain" with --restraint--.

Signed and Sealed this
First Day of October, 2013

Teresa Stanek Rea
*Deputy Director of the United States Patent and Trademark Office*